Patented Nov. 11, 1924.

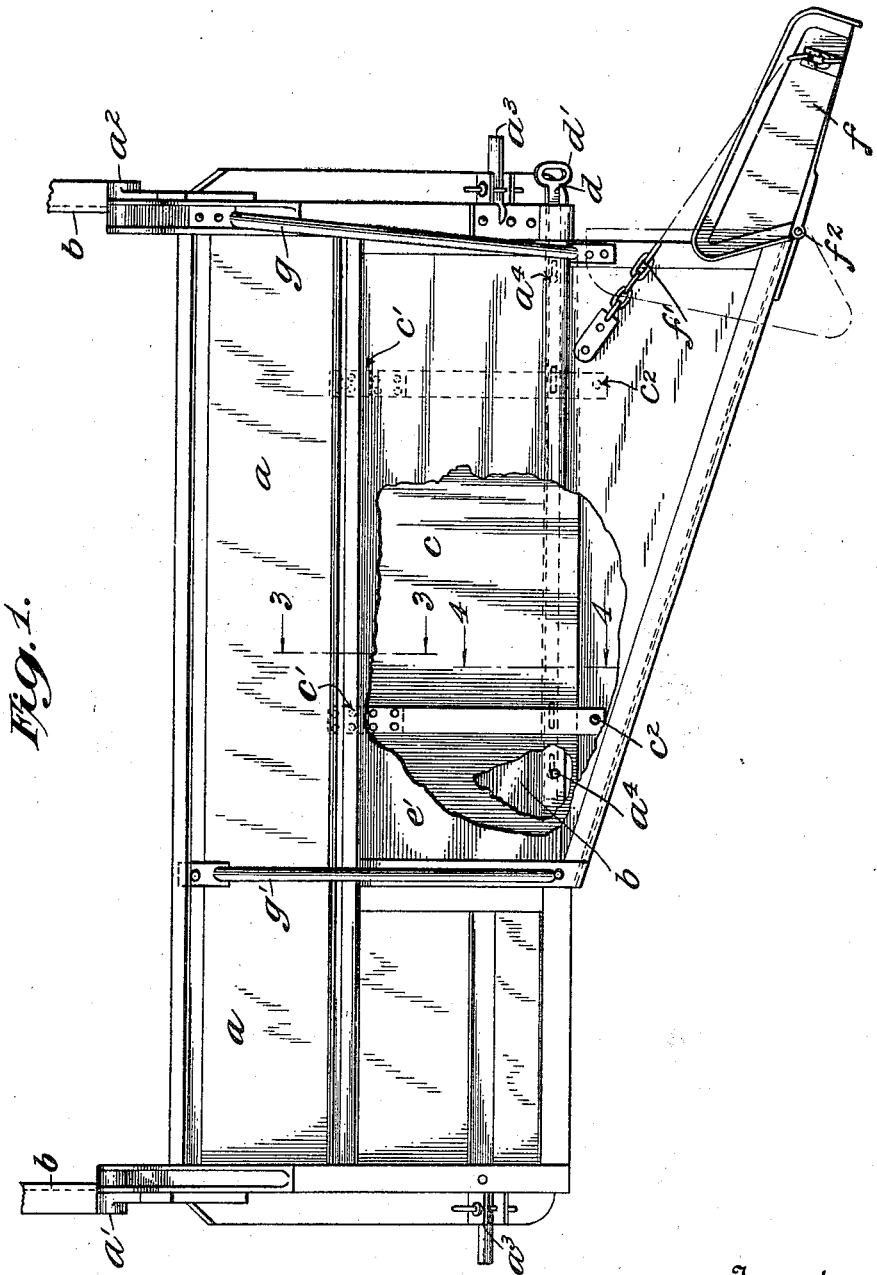

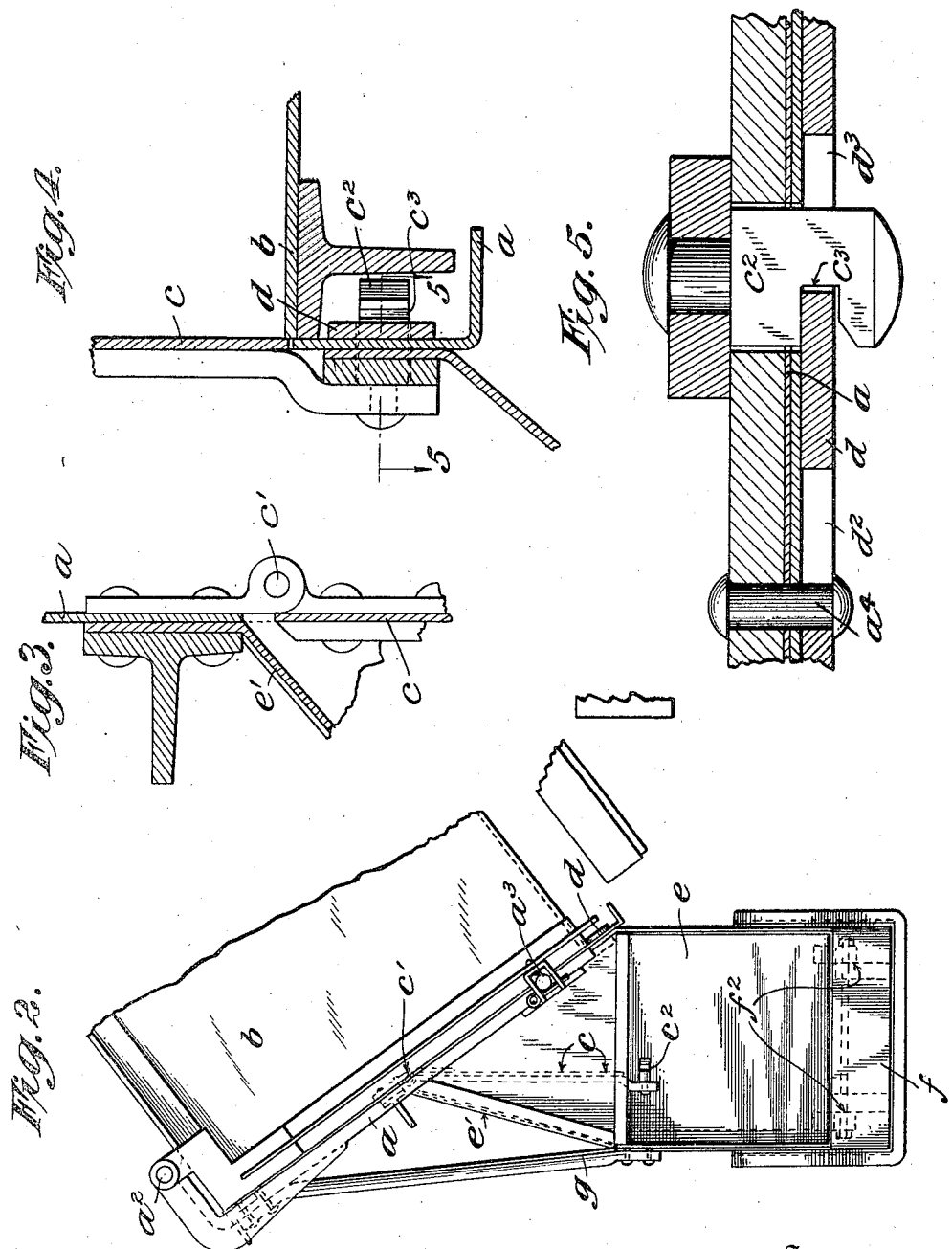

1,514,878

UNITED STATES PATENT OFFICE.

JAMES F. SWEENEY, OF PITTSBURGH, PENNSYLVANIA, ASSIGNOR TO INTERNATIONAL MOTOR COMPANY, OF NEW YORK, N. Y., A CORPORATION OF DELAWARE.

TAIL GATE.

Application filed April 26, 1921. Serial No. 464,660.

*To all whom it may concern:*

Be it known that I, JAMES F. SWEENEY, a citizen of the United States, residing in the city of Pittsburgh, in the State of Pennsylvania, have invented certain new and useful Improvements in Tail Gates, of which the following is a specification, reference being had to the accompanying drawings, forming a part hereof.

This invention relates to an improved tail gate for dumping bodies and is designed primarily with reference to tail gates for tilting bodies of motor vehicles adapted for discharging coal or the like. The principal object of the invention is to provide a tail gate which shall be essentially of usual construction in its relation to the body and in its movements for discharge and shall, in addition, have incorporated directly therein a supplemental gate or trap door whereby, upon occasion, the contents of the body can be thrown out through a special chute carried with the tail gate and directed for discharge in a somewhat confined stream in some predetermined direction. A further object is to associate with a trap door for the purpose described a novel chute which is carried with the tail gate and is adapted to receive the contents of the body through the trap door and discharge the contents effectively along an inclined way which in the discharging position is inclined in one plane only with respect to the ground, the sides of the inclined way being substantially vertical when in such position. A more specific object of the invention is to provide a discharging tail gate of the character described which shall enable the contents of the body to be discharged at one side of the vehicle thereby making it especially useful for the delivery of coal into manholes which so often are placed in such relation to the curb as to prevent the truck from being so placed as to permit the body to discharge directly into the manhole. With the improved construction it is proposed that the preferred form of chute shall extend from the trap door transversely of the body and have an extension extending beyond the side wheels of the vehicle. Other features of the invention have to do with details of construction and particularly with the form and relation of parts and the locking mechanism of the trap door.

Reference is now to be had to the accompanying drawings for a detailed description of the embodiment of the invention, wherein—

Figure 1 is a view in rear elevation of an improved tail gate, parts of the wall of the chute end of the trap door being broken away in the interest of clearness.

Figure 2 is a view in side elevation of the improved chute with a fragment of a tilting body indicated.

Figures 3 and 4 are sectional fragmentary detail views taken respectively on the planes indicated by the lines 3—3 and 4—4 of Figure 1 and looking in the direction of the arrows.

Figure 5 is a fragmentary sectional detail view of the locking bar for the trap door taken on the plane indicated by the line 5—5 of Figure 4 and looking in the direction of the arrows.

The improved tail gate $a$ is shown as hinged at its upper edge, as at $a'$, $a^2$, to a tilting body $b$ and as having locking devices $a^3$ adjacent its lower side edges for securing it releasably to the body in any approved manner, all in accordance with standard practice in tail gate construction. The improved gate has part of its wall formed with a supplementary gate or trap door $c$ which may be hinged along its upper edge to the gate $a$ as by suitable hinge joints indicated at $c'$. The tail gate $a$ carries adjacent its lower edge suitable hand operated locking means for the trap door $c$, whereby the latter may be released or locked as desired. These locking means may take different forms and it lies within the skill of a mechanic to change their structure without departing from the scope of the present invention. In the preferred form there is mounted slidably across the lower edge of the tail gate $a$ a locking bar $d$ having at its exposed end a suitable handle $d'$ for convenient manual operation of the bar. The bar may have intermediate its ends a slot and stud connection indicated by the slots $d^2$ and co-operating headed studs $a^4$ of the bar and tail gate respectively. When the bar $d$ is slid it co-operates with the guide studs $a^4$. The trap door carries adjacent its lower edge suitable hooks $c^2$ adapted to extend through slots $d^3$ formed in the bar $d$ and having recesses $c^3$ along their side edges to receive the bar $d$ when it is slid to engage such recesses.

In the illustrated construction the trap door $c$ is designed to extend for about two-thirds of the width of the tail gate and have something over half of its height. These proportions may, of course, be changed to suit conditions. Overlying the trap door $c$ and projecting from the rear wall of the tail gate is an enclosed chute having an inclined floor $e$ lying under the lower edge of the trap door $c$ and extending transversely thereof from a point opposite one end towards the side of the body. This floor extends downwardly towards the side of the body so as to accelerate the discharge of the contents. The chute has an inclined cover $e'$ extending from a point above the hinge line of the trap door $c$ and outwardly from the plane of the tail gate. End walls for the chute may be provided in vertical planes at opposite ends of the trap door $c$. To the lower discharge end of the floor $e$ of the chute may be pivoted an auxiliary opening chute $f$ which, when lowered, will lie in prolongation of the floor $e$ and be held in proper relation thereto, as by means of chains $f'$, and which may be swung upwardly about its hinged joint $f^2$ to close the open end of the improved chute and be secured in raised position by hooking up the links of the chain $f'$. The improved chute may be supported with all necessary strength and rigidity from the tail gate as by means of truss rods $g$, $g'$.

The floor $e$ of the improved chute is preferably disposed in one plane at such an angle to the floor of the body $b$ that when the body is tilted to its normal discharge position the floor $e$ will be tilted in one plane only with respect to the ground thereby affording the most effective discharge surface. This means that the angle between the floor of the body and the floor of the chute, considered transversely, is equal to the dumping angle of the body. The trap door $c$ when unlocked by sliding the bar $d$ out of engagement with the retaining hook $c^2$ may swing open when the body $b$ is tilted within its housing $e'$ thereby permitting the contents of the body to flow freely along the floor $e$ of the discharge chute. With the auxiliary chute $f$ supported in alinement with the floor $e$, the material will be directed to the side of the dumping body $b$ and this is of especial convenience in the delivery of coal into manholes.

It is to be understood that the invention is not limited to the precise direction of flow which is given to the material with relation to the body but since the illustrated embodiment is concerned with a coal truck the design is intended to take care of the conditions to be met most frequently in the delivery of coal.

The scope of the invention will appear from the appended claims.

I claim as my invention:

1. In a tilting dump body, a hinged tail gate having a trap door therein and a discharge chute formed thereon with one end disposed under the trap door and whereof the floor extends downwardly and transversely of the body and terminates at one side thereof, said floor in the longitudinal direction of the body being disposed at an angle with respect to the floor of the body substantially equal to the dumping angle thereof.

2. In a tilting dump body a tail gate hinged at its upper edge to the body, locking devices to secure the tail gate to the body releasably, a trap door formed of part of the tail gate, a locking bar slidably mounted on the tail gate and provided with slots, and hooks carried adjacent the lower edge of the trap door to enter said slots and be engaged releasably by said bar.

This specification signed this 15th day of April, A. D. 1921.

JAMES F. SWEENEY.